(12) United States Patent
Amiel et al.

(10) Patent No.: US 9,080,030 B2
(45) Date of Patent: Jul. 14, 2015

(54) LOW VOC AND APE FREE UNIVERSAL PAINT COLOURANT COMPOSITIONS

(75) Inventors: Pat Amiel, Kleinberg (CA); Adam Carleton, Milton (CA); Alison Crumblehulme, Burlington (CA); Mirceta Elez, Mississauga (CA); Herman Persuad, Brampton (CA); Rahila Roshan, Brampton (CA); Nerine Myers-Allen, Georgetown (CA)

(73) Assignee: LORAMA GROUP INTERNATIONAL INC., St. Michael (BB)

( * ) Notice: Subject to any disclaimer, the term of this patent is extended or adjusted under 35 U.S.C. 154(b) by 0 days.

(21) Appl. No.: 13/822,782

(22) PCT Filed: Sep. 9, 2010

(86) PCT No.: PCT/CA2010/001439
§ 371 (c)(1),
(2), (4) Date: Jun. 28, 2013

(87) PCT Pub. No.: WO2012/034208
PCT Pub. Date: Mar. 22, 2012

(65) Prior Publication Data
US 2013/0276672 A1 Oct. 24, 2013

(51) Int. Cl.
*C09D 7/02* (2006.01)
*C08K 5/053* (2006.01)
*C09D 5/02* (2006.01)

(52) U.S. Cl.
CPC ............... *C08K 5/053* (2013.01); *C09D 5/027* (2013.01); *C09D 7/02* (2013.01)

(58) Field of Classification Search
CPC ........... C09D 5/027; C09D 7/02; C08K 5/053
USPC .................... 106/499, 311; 252/364
See application file for complete search history.

(56) References Cited

U.S. PATENT DOCUMENTS 5,912,223 A * 6/1999 Drapier .................... 510/417
6,121,228 A * 9/2000 Drapier et al. ............. 510/417

FOREIGN PATENT DOCUMENTS

DE 102007014874 A1 * 10/2008
JP 2004-217730 A * 8/2004

OTHER PUBLICATIONS

Derwent-Acc-No. 2008-M33912 (abstract of Chinese Patent Specification No. CN 101084949 A (Dec. 2007).*

* cited by examiner

*Primary Examiner* — Anthony J Green

(57) ABSTRACT

The present invention relates to a universal colorant composition that is essentially free of volatile organic compounds (VOCs) and alkyl phenol ethoxylates (APEs). The present invention comprises a dispersing vehicle that comprises a low molecular weight carbamide compound, a C3-C5 polyalcohol, a polyethylene glycol, and optionally water. The dispersing vehicle provides excellent humectant and dispersing properties. The colorant composition comprising the dispersing vehicle maintains its stability and functionality following extended exposure to the atmosphere and/or temperature extremes. The present invention provides a colorant composition that is universally compatible with a wide variety of aqueous/water-based and organic solvent-based paints and coatings, while exhibiting physical and performance characteristics that are comparable to conventional colorant compositions that contain VOCs and APEs. A process for preparing a universal colorant composition for tinting a wide variety of aqueous/water-based and organic solvent-based paints and coatings is also provided.

12 Claims, 3 Drawing Sheets

LOW VOC AND APE FREE UNIVERSAL PAINT COLOURANT COMPOSITIONS

FIELD OF THE INVENTION

The present invention relates to a universal paint colourant composition that is low in volatile organic compounds (VOCs) and free of alkyl phenol ethoxylates (APEs), and is suitable for tinting both organic solvent-based and water-based architectural paints and coatings.

BACKGROUND OF THE INVENTION

Architectural coatings and paints are commonly used on buildings, floors and furnishings to provide decorative effects as well as to protect surfaces from corrosion, oxidation and other damage due to physical stress and/or environmental deterioration.

In general, paints are composed of a vehicle, pigments or other colourant agents, and additives to modulate the physical characteristics of the paint, such as drying time, ease of application, viscosity, resistance to wear, etc. The vehicle may be an organic solvent or water-based, and consists of resin and solvent components. Alkyd paints are referred to as organic solvent-based as the alkyd resin is diluted with organic solvents such as hydrocarbons. Latex or emulsion paints (collectively "latex paint") are polymers dispersed in a water phase and so are called "water-based". Latex paints and coatings are popular for use in buildings, as the paints are non-flammable, and the paints and tools for applying such paints are easy to clean up, requiring only water and/or water-based cleaning products.

In the absence of any pigments, alkyd and latex paints are uncoloured, and generally appear translucent to the eye. Titanium dioxide pigment is added to produce white paints. Other pigments may be added to alkyd and latex paints and coatings, to provide colour ("tint"), as well as provide other decorative effects, for example, opacity; matte or glossy effect; metallic or pearlescent finishes. Pigments may also be added to modulate other physical characteristics of the resultant paint or coating, such as hardness, durability and water resistance.

Pigments may be composed of inorganic compounds such as iron oxides and other transition metal compounds. Pigments may also be composed of organic compounds such as azo compounds, quinacridones, and copper phthalocyanine complexes. Pure pigments are generally provided in solid, dry powder form composed of primary particles, aggregates (clusters of particles rigidly joined together) and agglomerates (loose collections of primary particles and aggregates). To make coloured paint, pigments are incorporated into the paint as powders during paint manufacture to form a stable, colloidal dispersion of the pigment within the vehicle. The pigment must be evenly dispersed throughout the paint to form a uniform, homogeneous composition.

Solid dry pigments can be difficult or impossible to disperse into the base paint without the aid of a surface-active agent ("surfactant") that lowers interfacial tension at phase boundaries, such as liquid-air, or between two immiscible liquids (for example, water-organic solvent) (Bieleman, J. "Chapter 4: Surface-Active Agents" in Additives for Coatings, J. Bieleman, Ed., Wiley-VCH: Weinheim, 2000). Due to their insolubility in most solvents and difficulty to disperse in liquid media, dry pigments are typically formulated into a concentrated liquid or wet paste (a "colourant concentrate") which may then be added by the end user to an uncoloured or white finished paint, called the "base paint". In order to make a colourant, the dry pigment is "wetted" with a vehicle containing a surfactant, wherein the pigment-air interface is replaced with a pigment-liquid medium interface. The pigment agglomerates are broken down mechanically and also wetted by the surfactant. Other additives can be added to aid dispersion of the pigment in the colourant, and to improve other performance characteristics, such as extending shelf-life, and modulating the physical characteristics of the resultant tinted paint.

A paint colourant comprises one or more pigments, and a carrier or vehicle for the pigment(s). Thus, the dispersing vehicle is of primary importance to the performance of any resultant paint colourant. The most significant component of any dispersing vehicle is a compound which has dispersant activity. One or more dispersant compounds are required for wetting the particles and agglomerates of pigment, for the formation of a uniform dispersion of the pigment during in the composition, and stabilization of the dispersion once formed. The dispersant aids in the inhibition of flocculation when the colourant is incorporated into the base paint, and eliminates precipitation and/or sedimentation of the pigment out of the composition. In order to have a colourant concentrate that is compatible with both water-based and organic solvent-based paints, it is necessary to have a vehicle for carrying the pigments that is miscible in both water and organic solvents.

To maximize industrial and commercial applicability, as well as for the purposes of economy and ease of use by the endpoint consumer, it is desirable to have a "universal" paint colourant that may be used to tint both water-based and organic solvent-based paints. As with the paints to be tinted, universal paint colourants may also be organic solvent-based or water-based. However, it is difficult formulate an organic solvent-based paint colourant that is suitable for dispersion into a water-based paint. For the purposes of preparing a universal colourant, it is preferable to have a colourant that is water/aqueous-based, and add surfactants that allow incorporation of the colourant into both organic solvent-based and water-based paints. However, water-based colourant concentrates require the presence of a humectant to retain water and maintain fluidity. The presence of a humectant is particularly important for maintaining fluidity in colourants which are provided in concentrated form.

To ensure the compatibility of universal colourants in both water-based and solvent-based paints, colourants typically contain relatively high levels of surfactants and other additives. However, the presence of these surfactants and additives can disrupt the rheological network formed by the associative thickeners in water-based paints, resulting in a reduction in viscosity when such base paints are tinted. When preparing deep coloured paints, relatively large quantities of universal colourant must be added to the base paint to achieve the desired effect. However, these base paints may exhibit a large drop in viscosity upon addition and mixing of the universal colourant. This viscosity drop can result in a number of negative effects on the performance of the resultant tinted paint, such as poor sag control, syneresis (expulsion of fluid from the composition) and settling out of pigments if the tinted paint is stored for some time. Therefore, universal colourants must be formulated in such a way so as to avoid such a viscosity drop yet still allow maximum compatibility with a wide variety of base paints.

A relatively small series of different universal paint colourants may be added in various amounts and combinations to an untinted base paint, in order to provide a large number of different paint colours. Paints and coatings may be tinted with a colourant, such as a universal colourant, in large volumes and then sold as a coloured product. Paints may also be tinted "in-store" prior to sale to the end consumer. In-store tinting allows stores and businesses to offer many different colours of paints to customers while only needing to stock untinted base paints and a series of different universal colourants. In order to tint paints in-store, dispensing equipment is used to add specific volumes of the universal colourants to the base paints. Such equipment generally includes a storage tank or canister, and dispensing nozzles. As the equipment can be exposed to the atmosphere for long periods of time between use, any colourant left in the dispensing equipment may dry up and clog the dispensing nozzle, unless it has been formulated to include humectants that help to retain or attract water in the universal colourant composition and thus preserve fluidity. Also, any colourant held in storage before dispensing must be able to withstand long periods of storage, without any significant change, such as settling of pigments from the composition, and changes in viscosity and/or rheology. During such storage, there may be some exposure to air and fluctuations in temperature. Thus, universal paint colourants, particularly those used for in-store tinting, must have a number of performance characteristics to aid in delivery and dispensing, such as an acceptably long open-air dry time, and good long-term storage stability, while still maintaining its universal compatibility with various types of base paints. Furthermore, prior to use, the colourants must exhibit good "in-can" stability. Colourants may experience extremes in temperature during storage and transport to the point of use, and therefore, must have freeze-thaw stability.

Previously, low molecular weight glycols, in particular ethylene glycol and diethylene glycol, were most commonly used as the primary vehicle for preparing universal colourant concentrates. Ethylene glycol and diethylene glycol are highly effective wetting vehicles, preventing the re-agglomeration of pigment particles during storage. They are also highly effective humectants, allowing the colourant composition to retain water for relatively long periods of time. This in turns helps to retain fluidity of the colourant during storage and particularly during exposure to the atmosphere when residing within dispensing equipment. However, ethylene glycol and diethylene glycol are considered to be volatile organic compounds (VOCs). VOCs have vapour pressures at room temperature and normal atmospheric conditions that are considered significant, i.e. above 1.3 N/m². If present in paints and coatings, VOCs contribute to both indoor and outdoor air pollution. In closed environments, VOCs can cause allergic reactions, respiratory irritations, and other negative health effects, particularly if the exposure is long-term. Upon application of the paint or coating, VOCs are often detectable as a strong odour that can linger for many days after application. In addition to being considered a VOC, ethylene glycol is toxic and suspected to be teratogenic.

In addition to a vehicle for the pigments in a colourant composition, one or more surfactants are usually present in a universal colourant to provide compatibility with the paints and coatings they are incorporated into. Alkyl phenol ethoxylates (APEs) are commonly used as the primary surfactant in conventional colourant compositions, particularly in universal colourants. Alkyl phenol ethoxylates commonly used by architectural coating manufacturers are octylphenol and nonylphenol ethoxolates with a degree of ethoxylation between 5 and 10 (Bieleman, J. *PPCJ* 1995, 3, 17). APEs, particularly nonylphenol ethoxylates, became popular surfactants in paint colourants due to their low cost combined with highly effective wetting and dispersing properties for pigments. However, the main degradation products of nonylphenol ethoxylates are nonylphenol and shorter chain APEs, alkylphenol diethoxylates and alkylphenol acetic acid. Nonylphenol tends to persist in the environment and is toxic to aquatic life. In addition, nonylphenol is an endocrine disruptor and has weak estrogenic activity in vivo.

Due to mounting concerns over the negative impact of VOCs on the environment and on human health, many jurisdictions around the world have imposed regulations on the VOC content in architectural coatings, while others are beginning to follow suit. As well, in light of growing awareness of the negative effect of both VOCs and APEs on human health and the environment, consumers are turning increasingly towards VOC-free or low-VOC paint compositions that are preferably also APE-free. Manufacturers have been able to formulate low/zero-VOC and APE-free untinted base paints without significantly altering performance characteristics compared to conventional base paints containing VOCs and APEs. Such low/zero-VOC and APE-free base paints are now readily available to consumers. However, it has proven difficult to formulate universal paint colourant compositions that are free of both VOCs and APEs, yet still have comparable compatibility and performance characteristics (for example, good storage stability, colour strength and tone and other physical properties) to their conventional counterparts, while remaining competitive in terms of price.

In order to reduce or eliminate VOCs in universal paint colourant compositions, it is necessary to replace the previously employed ethylene glycol and diethylene glycol with other wetting agents/dispersants and humectants which are less volatile. However, when less volatile alternatives such as propylene glycol and polypropylene glycols such as dipropylene glycol are used, they have been found to have a negative impact on the water-resistance of the resultant tinted paints. In addition, propylene glycol and dipropylene glycol have very strong odours which are unacceptable to consumers. In addition, emulsifiable oils, such as edible oils and those used in food and personal care/cosmetic manufacturing, have been attempted as alternatives (for example, oleic acid, castor oil and mineral oil) but have not matched the performance of ethylene glycol and diethylene glycol. Others have attempted to replace ethylene glycol and diethylene glycol with various polymers as dispersants (see, for example, U.S. Pat. No. 6,235,813; U.S. Pat. No. 6,312,513, and U.S. Pat. No. 7,442,724).

At the same time, manufacturers have sought to replace APEs with surfactants that are perceived to be non-toxic. Suitable alternatives to APEs, particularly nonylphenol ethoxylate, have been identified as secondary and branched alcohol ethoxylates, alkyl polymers and tallow derivatives (see for example, K. Holmberg, B. Jonsson, B. Kronberg and B. Lindman, *Surfactants and Polymers in Aqueous Solution*, 2nd ed.; Wiley & Sons: Chichester, 2003).

A number of VOC- and APE-free paint colourant compositions have been produced thus far (see for example, U.S. Pat. No. 5,814,144). However, none of the alternatives to VOCs and APEs combined have produced a universal paint colourant that is truly compatible with both organic solvent-based paints and water-based paints, and that appears to match the dispersant/humectant performance and low cost of ethylene glycol and diethylene glycol. Examples of VOC- and APE-free universal paint colourants that have been produced thus far often have inferior performance characteristics compared to their conventional counterparts. For example, such colourants may have unacceptably short open-air dry times, becoming too thick to be dispensed or drying out completely and clogging the dispensing equipment, particularly the dispensing nozzles. In such cases, stores and business offering in-store tinting of base paints have had to resort to retrofitting dispensing equipment with humidity chambers in order to maintain the viscosity of the colourant compositions. In other cases, VOC- and APE-free paint colourants that are presently available may have poor compatibility with both organic solvent-based and water-based paints, and may only be compatible with one type of paint. At the same time, such colourants may be significantly more expensive than conventional universal paint colourants.

Accordingly, there is a need for alternative universal paint colourants that are free of VOCs and APEs that have satisfactory performance characteristics, such as good storage stability, good freeze-thaw stability and ease of dispensing, while remaining competitive in terms of price when compared to conventional universal paint colourants.

SUMMARY OF THE INVENTION

In accordance with a broad aspect of the present invention, there is provided a universal colourant composition comprising one or more colourant agents, and a dispersing vehicle, wherein said dispersing vehicle comprises:

(i) one or more compounds selected from the group consisting of compounds of formula (1):

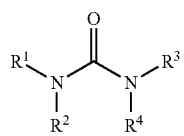
(1)

wherein $R^1$, $R^2$, $R^3$ and $R^4$ are each independently selected from the group consisting of hydrogen, $C_1$-$C_3$ alkyl, and $C_1$-$C_3$ alkanol, and wherein at least one of $R^1$, $R^2$, $R^3$ and $R^4$ is hydrogen;

(ii) one or more compounds selected from the group consisting of compounds of formula (2):

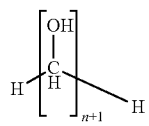
(2)

wherein n=2, 3, or 4; and (iii) one or more polyethylene glycol(s) of average molecular weight between about 200 g/mol to about 600 g/mol; and (iv) optionally water;

The above-noted universal colourant composition optionally comprises one or more additives selected from the group consisting of one or more surfactants, one or more humectants, one or more extender fillers, one or more anti-foaming agents, one or more pH modifiers, one or more preservatives, and any combination thereof. The preservatives may be selected from the group consisting of a biocide, a fungicide, and an algaecide. In addition, the above-noted colourant composition is essentially free of volatile organic compounds and alkyl phenol ethoxylates. The above-noted colourant composition is "universally" compatible, that is, it is compatible with a wide variety of both organic solvent-based and water/aqueous-based paints and coatings.

In an embodiment of the invention, the components of the dispersing vehicle are present in the following amounts: (i) the compound(s) of formula (1), in the amount of about 2% to about 20% by weight of said dispersing vehicle; (ii) the compound(s) of formula (2), in the amount of about 10% to about 65% by weight of said dispersing vehicle; (iii) one or more polyethylene glycol(s) of average molecular weight between about 200 g/mol to about 600 g/mol, in the amount of about 5% to about 45% by weight of said dispersing vehicle; and (iv) water, if present, in the amount of about 3% to about 25% by weight of said dispersing vehicle.

In another embodiment of the invention, the components of the dispersing vehicle are present in the following amounts: (i) the compound(s) of formula (1), in the amount of about 3% to about 18% by weight of said dispersing vehicle; (ii) the compound(s) of formula (2), in the amount of about 15% to about 60% by weight of said dispersing vehicle; (iii) one or more polyethylene glycol(s) of average molecular weight between about 200 g/mol to about 600 g/mol, in the amount of about 8% to about 40% by weight of said dispersing vehicle; and (iv) water, if present, in the amount of about 4% to about 20% by weight of said dispersing vehicle.

In an embodiment of the invention, the dispersing vehicle comprises urea or 2-hydroxyethyl urea. The dispersing vehicle may also comprise urea and 2-hydroxyethyl urea.

In another embodiment of the invention, the dispersing vehicle comprises glycerol.

In yet another embodiment of the invention, the dispersing vehicle comprises polyethylene glycol of average molecular weight of 400 g/mol (PEG-400).

In an embodiment of the invention, the dispersing vehicle comprises urea, glycerol, and PEG-400. The dispersing vehicle may comprise: (i) urea, in the amount of about 5% by weight of the dispersing vehicle; (ii) glycerol, in the amount of about 55% by weight of the dispersing vehicle; and (iii) PEG-400, in the amount of about 40% by weight of the dispersing vehicle.

In a preferred embodiment, the dispersing vehicle comprises urea, glycerol, PEG-400 and water. The dispersing vehicle may comprise (i) urea, in the amount of about 8% by weight of the dispersing vehicle; (ii) glycerol, in the amount of about 53% by weight of the dispersing vehicle; (iii) PEG-400, in the amount of about 33% by weight of the dispersing vehicle; and (iv) water, in the amount of about 6% by weight of the dispersing vehicle.

In yet another preferred embodiment, the dispersing vehicle comprises (i) urea, in the amount of about 5% by weight of said dispersing vehicle; (ii) glycerol, in the amount of about 52% to about 53% by weight of said dispersing vehicle; (iii) PEG-400, in the amount of about 38% by weight of said dispersing vehicle; and (iv) water, in the amount of about 5% by weight of said dispersing vehicle.

In a broad aspect of the invention, there is provided a dispersing vehicle for a universal colourant composition, wherein said dispersing vehicle is as provided in any of the above-described embodiments.

The universal colourant composition as described above may be aqueous-based.

The universal colourant composition as provided in any of the above-noted embodiments may be provided in the form of a universal colourant concentrate.

The universal colourant composition comprises one or more colourant agents which may be selected from the group consisting of a pigment, a dye, a tinting agent, a metal effect agent, and any combination thereof.

In another aspect of the invention, there is provided a method of dispersing colourants in a liquid medium, comprising: (a) adding the colourant composition as described above to said liquid medium; and (b) mixing said colourant composition with the liquid medium to form a homogenous composition. The liquid medium may be a paint or coating. The paint or coating may be organic solvent-based, or it may be water/aqueous-based.

In another broad aspect of the invention, there is provided a process for preparing a universal colourant composition comprising:

(a) providing a dispersing vehicle as provided in any of the above-described embodiments;

(b) combining one or more colourants with said dispersing vehicle to form a mixture; and (c) optionally combining the mixture of step (b) with one or more additives selected from the group consisting of one or more surfactants, one or more humectants, one or more extender fillers, one or more anti-foaming agents, one or more pH modifiers, one or more preservatives, and any combination thereof.

In yet another broad aspect of the invention, there is provided a use of a dispersing vehicle for preparing a universal colourant composition for tinting a paint or coating, wherein said dispersing vehicle is as provided in any of the above-described embodiments.

An advantage of the present invention is that it provides a universal paint colourant composition that is compatible with numerous types of paints and coatings, including organic solvent-based and water-based paints and coatings.

Another advantage of the present invention is that it provides a universal paint colourant composition free of volatile organic compounds (VOCs) and alkyl phenol ethoxylates (APEs). In addition, the universal paint colourant composition is simple to prepare, and comprises a dispersing vehicle for which the ingredients are of low cost and readily available. Thus, the universal paint colourant composition is comparable in price to conventional universal paint colourants that contain VOCs and/or APEs.

The universal paint colourant composition of the present invention may be added to a wide variety of paints and coatings yet still provide comparable performance to conventional universal paint colourants containing VOCs and/or APEs that are used to tint the same types of paints and coatings.

The present invention may be provided in the form of a colourant concentrate, thus providing an efficient and economical means of preparing numerous number of paint colours from a relatively small number of different colourants and untinted bases. This is an advantage to stores and businesses that provide in-store tinting of paints to customers, as it is only necessary to stock a series of colourant concentrates and untinted base paints.

In addition, the present invention has excellent storage stability, showing stable rheology during long periods of storage, during which there may be extended periods of exposure to the atmosphere, and/or wide variations in temperature (for example, "freeze/thaw conditions", wherein the temperature falls below 0° C. and then rises above 0° C.). The universal paint colourant composition may be subjected to variations in temperature, long storage times, and relatively long exposures to the atmosphere, without any changes observed in physical and performance characteristics, and without any negative impact on the performance characteristics of the resultant tinted paint or coating. In particular, the universal colourant composition of the present invention has excellent stability in dispensing equipment that is typically used by businesses that provide in-store tinting of paints. The universal paint colourant composition has an acceptably long open-air dry time of at least 14 days. That is, the universal paint colourant composition may be left exposed to the atmosphere for at least 14 days between dispensing, without any significant change in physical and performance characteristics, such as rheology (flow, viscosity), universal compatibility, and colour strength. This allows the universal paint colourant composition of the present invention to remain stored within dispensing equipment for relatively long periods of time, without any significant changes in rheology or composition. Thus, the universal paint colourant composition does not clog dispensing nozzles or settle within the holding tank or canister of the dispensing equipment during the course of normal in-store usage. This in turn allows accurate dispensing of colourant and reproducible tinting each time a base paint is tinted. As such, the present invention is superior to previous and current VOC- and/or APE-free universal paint colourants that often lack storage stability under the conditions noted above.

Another advantage of the present invention is that the universal paint colourant composition may be added to both water-based and organic solvent-based paints without causing a significant drop in viscosity in the resultant tinted paint.

Yet another advantage of the present invention is that the universal paint colourant composition is essentially free of VOCs and APEs, and it is composed of ingredients that are non-toxic or of relatively low toxicity. As a result, the universal paint colourant composition of the invention is environmentally friendly and it is less toxic compared to conventional paint colourants.

Other and further advantages and features of the invention will be apparent to those skilled in the art from the following detailed description of an embodiment thereof.

BRIEF DESCRIPTION OF THE DRAWINGS

The present invention will be further understood from the following detailed description of an embodiment of the invention, with reference to the drawings in which.

DETAILED DESCRIPTION OF EMBODIMENTS

Figure 1:
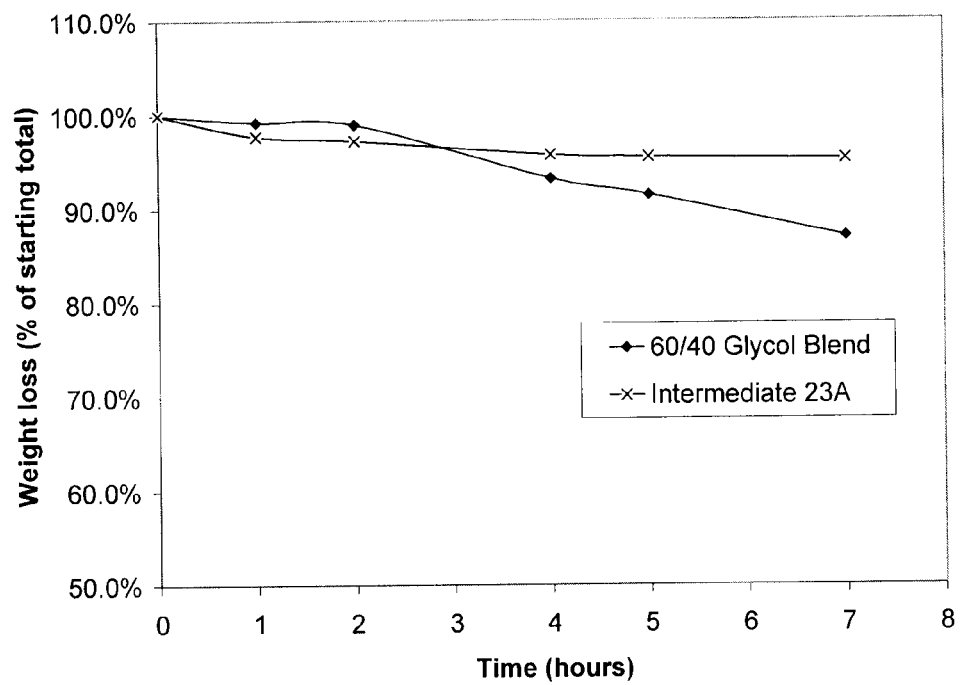
FIG. 1 illustrates the decrease in weight due to evaporation during storage at 60° C. for 4 hours, followed by 80° C. for the subsequent 4 hours (see Example 1.3) of the following dispersing vehicles: (i) a VOC, APE-free dispersing vehicle, Intermediate 23A, prepared according to Example 1.1 (Table 1.10), and (ii) a conventional glycol vehicle, composed of 60% w/w ethylene glycol and 40% w/w diethylene glycol (denoted as "60/40 glycol blend")

A "universal" colourant composition is understood to be compatible with a wide variety of both organic solvent-based and water/aqueous-based paints and coatings. A universal paint colourant composition is an economical and efficient means of tinting both organic solvent-based and water/aqueous-based paints and coatings. Such compositions are commonly dispensed as concentrated liquids or pastes, using mechanical dispensing equipment that dispenses specific volumes of the colourant composition into a paint or coating. Previous "conventional" universal paint colourants contain volatile organic compounds (VOCs) and alkylphenol ethoxylates (APES). Due to environmental and health concerns, it is highly desirable to reduce or eliminate entirely the VOC and APE content of universal paint colourants without compromising the performance characteristics when compared to conventional universal paint colourants.

The term "paint" or "coating" refers to a film or thin layer applied to a surface substrate. As paint is a type of coating, any reference to "paint" used herein refers to either paint or coating. Paints may be uncoloured, or they may contain a pigment, colourant, dye, or tinting agent that provides colour and/or opacity. Paints may also be transparent (for example, a stain) or opaque. Paints are typically composed of a solvent or carrier, and a pigment, dye, tinting agent, or colourant, and a polymeric binder for binding the components of the paint, as well as additives to obtain specific physical characteristics. The solvent or carrier may be an organic solvent or water/aqueous solution. Typical architectural organic solvent-based paints are based on alkyd resins or binders and are referred to as "alkyd paints". A water-based paint is also referred to as an "aqueous-based paint", a "latex paint", "acrylic paint" or "emulsion paint". The term "base paint" refers to an untinted paint or coating, that does not contain any colourant, pigment, dye, tinting agent or metal effect agent.

A "pigment" is a substance that imparts colour to another substance or mixture, such as a paint. A pigment is typically a solid in dry powder form, and it may be composed of one or more inorganic compounds or one or more organic compounds, or any mixture thereof. A "dye" also imparts colour to another substance or mixture, such as a paint. Dyes are coloured substances that have affinity for the substrate to which they are applied and are typically available in liquid form such as an aqueous solution. A "metal effect agent" provides metallic effect (for example, lustre, sheen, opalescence, iridescence) to another substance or mixture, such as a paint. A "tinting agent" is a general term for any substance that tints or imparts colour to another substance or mixture, such as a paint. A "colourant agent" refers collectively to any one of the following terms: pigment, dye, tinting agent and metal effect agent. A "colourant" or "colourant composition" refers to a mixture of additives and one or more colourant agents.

A "vehicle" or "dispersing vehicle" refers to a liquid medium or component for wetting and carrying the colourant agents and facilitates the incorporation of the colourant agents into other wet mixtures. The vehicle may optionally include one or more additional additives, such as a surfactant. Such additives may be used to aid in preparation of the vehicle, to provide additional stability (for example, by preventing or inhibiting settling of pigments from the mixture), and/or to aid in incorporation of the colourant in a base paint.

When attempting to formulate a low/zero-VOC universal paint colourant, manufacturers have most often attempted to replace the previously employed ethylene glycol and diethylene glycol as the main dispersing vehicle, with polyethylene glycols (see for example, U.S. Pat. No. 5,340,394). Polyethylene glycols ("PEG") are polyether polymers of ethylene oxide, prepared by homopolymerization of ethylene oxide. Polyethylene glycols are linear polymers of the following general formula:

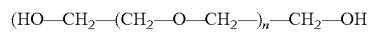

$(HO-CH_2-(CH_2-O-CH_2-)_n-CH_2-OH$

A given polyethylene glycol usually contains a series of polymers of slightly different length, and thus, it is common to provide an average molecular weight of the polymers present. In general, the average molecular weight of a polyethylene glycol is denoted by a number following the abbreviation "PEG". For example, "PEG-200" denotes a polyethylene glycol of average molecular weight 200 g/mol, containing polymers of molecular weight from about 190 g/mol to about 210 g/mol, with an average value of n=4 (*Merck Index*, 14$^{th}$ ed., Merck & Co. Inc.: New Jersey, 2006). Polyethlyene glycols are commercially available in a wide range of average molecular weights.

Polyethylene glycols have a long history of use as dispersants vehicles and/or humectants in cosmetic, food, and drug formulations. As such, they are considered to be relatively non-toxic, and as they are also not volatile, they would appear to be a good alternative to ethylene glycol/diethylene glycol as the main component in the vehicle in a low/zero-VOC paint colourant composition. However, it has been found that polyethylene glycols are not as effective dispersing vehicles or humectants as ethylene glycol and diethylene glycol. Universal paint colourant compositions containing polyethylene glycol in place of ethylene glycol/diethylene glycol, as the main dispersing vehicle, typically have poor storage stability and unacceptably short open-air dry times. As the colourant dispensing equipment used for tinting base paints is often exposed to the atmosphere for long periods of time (for example, over holidays when stores and businesses are closed), such compositions often dry out too quickly and clog the nozzles of the dispensing equipment, leading to problems with accurate dispensing and product wastage. Other attempts to formulate VOC- and APE-free universal paint colourants have resulted in colourants that may have poor performance characteristics, such as poor compatibility with alkyd base paints, particularly those formulated to meet low VOC requirements with high concentrations of alkyd solids or those modified with water-in-oil emulsions. Also, such alternatives are typically more expensive than conventional universal paint colourants.

It has now been discovered that a composition comprising the following components forms a highly suitable dispersing vehicle for use in preparation of a VOC- and APE-universal paint colourant composition. The dispersing vehicle provides a highly effective method for wetting and dispersing pigments and other colourant agents into a liquid medium, as occurs during preparation of a universal paint colourant composition. The components of the dispersing vehicle are as follows:

(i) one or more compounds selected from the group consisting of compounds of formula (1):

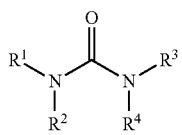

(1)

wherein $R^1$, $R^2$, $R^3$ and $R^4$ are each independently selected from the group consisting of hydrogen, $C_1$-$C_3$ alkyl, and $C_1$-$C_3$ alkanol, and wherein at least one of $R^1$, $R^2$, $R^3$ and $R^4$ is hydrogen;

(ii) one or more compounds selected from the group consisting of compounds of formula (2):

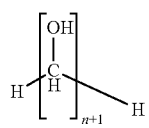

(2)

wherein n=2, 3, or 4;

(iii) a polyethylene glycol ranging in average molecular weight from PEG-200, having a lower range of 190 g/mol, to PEG-600, having an upper range of 630 g/mol; and (iv) optionally water.

It has now been found that by combining polyethylene glycols ranging in average molecular weight from PEG-200 to PEG-600, with at least one low molecular weight carbamide according to formula (1) above, at least one $C_3$-$C_5$ polyalcohol according to formula (2) above, and optionally water, an unforeseen and surprising synergistic effect is achieved. Each of the above-noted components of the composition alone do not provide acceptable dispersant and humectant properties in the resultant universal paint colourant composition. However, the composition comprising the above-noted compounds provides excellent activity for dispersing pigments and forms a highly suitable vehicle for pigments and other colourant agents in a universal paint colourant composition.

The above-described dispersing vehicle and the universal paint colourant composition comprising the dispersing vehicle are essentially free of VOCs and APEs. That is, the dispersing vehicle and the universal paint colourant composition comprising the dispersing vehicle are understood to be essentially free of organic compounds which have a vapour pressure above 1.3 N/m² at room temperature (about 25° C.), such as ethylene glycol, diethylene glycol, and dipropylene glycol. In addition, both compositions are understood to be essentially free of alkyl phenol ethoxylates such as octylphenol ethyoxylate and nonylphenol ethoxylate.

The universal colourant composition comprising the above-noted composition as the dispersing vehicle has an acceptably long open-air dry time of at least 14 days, without any significant change in physical and performance characteristics, such as rheology, "universal" compatibility with a wide variety of base paints, or colour strength. In addition, the universal paint colourant composition is compatible with a wide variety of both organic solvent-based and water-based paints and coatings.

Preferably, the above-noted components of the dispersing vehicle are present in the following concentration ranges, according to weight percent:

| Component | Weight % (approximate) |
|---|---|
| (i) one or more compounds of formula (1) | about 2 to about 20 |
| (ii) one or more compounds of formula (2) | about 10 to about 65 |
| iii) one or more PEGs of average molecular weight between about 200 g/mol to about 600 g/mol | about 5 to about 45 |
| (iv) water, if present | about 3 to about 25 |
| Total weight | 100 |

The compounds of formula (1) are known generally as carbamide compounds. In an embodiment, the universal paint colourant composition comprises a dispersing vehicle that comprises a carbamide of formula (1) wherein $R^1$, $R^2$, $R^3$ and $R^4$ are all hydrogen, i.e. urea. In another embodiment, the dispersing vehicle comprises a carbamide of formula (1) wherein $R^1$=—$(CH_2)_2$—OH, and $R^2$, $R^3$, $R^4$ are hydrogen, i.e. 2-hydroxyethyl urea. The dispersing vehicle may comprise urea and 2-hydroxyethyl urea. In yet another embodiment, the dispersing vehicle comprises more than one compound of formula (1).

The compounds of formula (2) are known generally as polyalcohols, sugar alcohols, polyols or polyhydric alcohols. In a preferred embodiment, the universal paint colourant composition comprises a dispersing vehicle that comprises a polyalcohol of formula (2) wherein n=2, i.e. glycerol (also known as glycerin or glycerine). In yet another embodiment, the dispersing vehicle comprises more than one compound of formula (2).

In an embodiment, the universal paint colourant composition comprises a dispersing vehicle that comprises a polyethylene glycol having an average molecular weight ranging from PEG-200 to PEG-600. In a preferred embodiment, the dispersing vehicle comprises PEG-400, with an average molecular weight of 400 g/mol, and containing polymers of molecular weight ranging from about 380 to 420 g/mol (*Merck Index*, 14th ed., Merck & Co. Inc.: New Jersey, 2006). Combinations of PEGs of different average molecular weight within the above-noted range of PEG-200 to PEG-600 may also be used.

In an embodiment, the dispersing vehicle comprises water. In another embodiment, the universal paint colourant composition comprises water. In a preferred embodiment, the universal paint colourant composition is aqueous-based.

Colourant agents that may be included in the universal paint colourant composition are known in the art (see for example, *Colour Index International*, 4th ed. http://www.colour-index.org. © 2009, Society of Dyers and Colorists, and American Association of Textile Chemists and Colorists). Non-limiting examples of suitable colourant agents include pigments such as titanium dioxide white, carbon black, lampblack, black iron oxide, red iron oxide, transparent red oxide, yellow iron oxide, transparent yellow oxide, brown iron oxide, phthalocyanine green, phthalocyanine blue, organics reds (such as naphthol red, quinacridone red, toluidine red and DPP organic red), quinacridone magenta, quinacridone violet, dinitroaniline orange, bismuth vanadate yellow and organic yellows such as monoazo yellow.

The universal paint colourant composition may also comprise additives that provide further beneficial performance characteristics. Such additives include, but are not limited to: surfactants, extenders/fillers, anti-foaming agents, pH modifiers, and preservatives such as fungicides and biocides. Guidelines for selection of suitable additives may be found in the art (see for example, *Additives for Coatings*, J. Bieleman, Ed., Wiley-VCH: Weinheim, 2000). In addition, any additives to be included in the universal paint colourant composition should be relatively non-volatile and have very low VOCs, or be essentially free of any known VOCs, such as ethylene glycol and propylene glycol. Also, any additives to be included should be essentially free of APEs known to be toxic or have toxic degradation products, such as octylphenol ethoxylate and nonylphenol ethoxylate. Commercially available examples of suitable additives are provided below in parentheses.

Non-limiting examples of surfactants that are suitable include secondary alcohol ethoxylates (for example, Tergitol® TMN-100×, Dow Chemical Co.), alkylaryl suphonates (for example, Zetasperse® 2300, Air Products & Chemicals Inc., tallow amines and tallow amine ethoxylates (for example, Ethomeen® T/12, AkzoNobel AG), alcohol phosphates and phosphate esters (for example, Zelec® NE, Stepan Co.; Rhodafac® BC-720, Rhodia Group Inc.), aryl poly glycols (for example, Borchi®0451, OMG Borchers GmbH), polar acidic esters and high molecular weight alcohols (for example, Disperbyk®-2096, BYK-Chemie GmbH; Enviro-Gem® AD-01, Air Products & Chemicals Inc.), modified urethane (for example, Borchi®0451, OMG Borchers GmbH), and lecithins such as soya lecithin. Preferred surfactants are those which are known to be non-toxic or have relatively low toxicity.

Extenders (also referred to as "fillers" or "extender fillers") may be included in the universal paint colourant composition to modify the properties of the colourant composition as well as the resultant tinted paint. Such properties include rheology (flowability, viscosity), sedimentation stability, film strength and control of pigment strength. The presence of one or more extenders can also help to further reduce the overall cost of the colourant composition. Non-limiting examples of extenders that may be used include aluminum silicate (china clay), magnesium silicate (talc), silica, calcium carbonate, barium sulphate and various types of clays such as smectite clays (for example, Bentone® EW, Elementis Specialties Inc.).

Anti-foaming agents may also be included in the universal paint colourant composition, to inhibit foaming during the preparation of the colourant composition. Examples of anti-foaming agents that may used include silicon emulsions (for example, KFO®, Emerald Foam Control LLC), silica oil, and mineral oil. Preferred anti-foaming agents are those which are known to be non-toxic and safe for use in cosmetic, food and drug preparations.

Suitable pH modifiers include sodium hydroxide, potassium hydroxide and other acids and bases that are well known in the art.

Preservatives may also be included in the universal paint colourant composition to extend the shelf-life of the composition by inhibiting growth of microbes. Preservatives include: biocides, which prevent or inhibit the growth of microorganisms such as bacteria; fungicides, which prevent or inhibit the growth of microorganisms such as fungi; and algaecides, which prevent or inhibit the growth of algae. Non-limiting examples of suitable preservatives include thiazole- and isothiazolinone-based biocides (for example, Mergal® and Troysan®, both by Troy Corp.) Preferably, any preservative that is added to the universal paint colourant composition will be added in the amount of about 0 to about 1% by weight of the overall composition. Also, preferred preservatives are those that are known to have low toxicity or are known to be non-toxic (for example, those that are commonly used in cosmetic, food and drug formulations).

The universal paint colourant composition based on the above-noted dispersing vehicle has very good storage stability and has excellent compatibility with a wide variety of organic solvent-based (alkyd) and water-based (latex) base paints. In particular, the universal paint colourant composition has an extended open-air dry time, and may be left to reside within dispensing equipment exposed to the atmosphere, for at least 14 days, without significant changes to physical and performance characteristics such as rheology (flow, viscosity), universal compatibility, or colour strength. In addition, the universal paint colourant composition does not cause a significant drop in viscosity upon addition to base paints, and thus does not cause any negative effects on the performance of the resultant tinted paint.

The universal paint colourant composition as provided above is free of VOCs (including volatile and toxic glycols such as ethylene glycol and diethylene glycol) and APEs, yet has characteristics that are comparable to conventional universal paint colourants containing VOCs and APEs. In addition, as all of the compounds used to prepare the dispersing vehicle are low cost and readily available, the universal paint colourant composition is competitive in price with conventional paint colourants. Moreover, the resultant universal colourant composition appears to be superior in terms of performance, storage stability, and compatibility to a number of other VOC- and APE-free universal paint colourants that are presently available to consumers.

Further details of the preferred embodiments of the invention are illustrated in the following Examples which are understood to be non-limiting with respect to the appended claims.

Example 1

Formulation and Testing of Dispersing Vehicle for Universal Paint Colourant 1.1 Formulation of VOC- and APE-Free Dispersing Vehicles A series of VOC- and APE-free dispersing vehicles were prepared, and their physical characteristics were observed, as follows.

Oleic acid ((9Z)-octadec-9-enoic-acid) is a mono-unsaturated fatty acid. It is naturally occurring in both plants and animals. Oleic acid has an emollient feel, and due to its presence in vegetable oils and animal fats, it is commonly found in food preparations. It is also used as a pharmaceutical excipient, typically as an emulsifier and/or solubilizer in aerosol formulations. It does not air dry readily, so it was thought to provide suitable humectant properties. As oleic acid was found to be difficult to emulsify in water-based compositions, surfactants were added in order to form stable emulsions. Samples of dispersing vehicle containing oleic acid were prepared according to the general composition provided in Table 1.1.

TABLE 1.1

Dispersing vehicle containing oleic acid, "Intermediate 7"
Intermediate 7

| Component | weight % |
| --- | --- |
| Emulsifier (surfactant) | 2.0 |
| Oleic acid | 27.0 |
| Water | 54.0 |
| Polysaccharide (LPR76 ™, Lorama Inc.) | 16.8 |
| Dimethylethanolamine | 0.2 |
| Total | 100.0 |

The oleic acid-containing composition according to Table 1.1 was tested as a dispersing vehicle in a yellow oxide 7C colourant composition according to the following formula provided in Table 1.2.

TABLE 1.2

Preparation of Yellow Oxide Colourant Composition

| Component | Weight (%) |
|---|---|
| Intermediate: 7 (Table 1.1), 20 (Table 1.5) or 21 (Table 1.6) | 15.0 |
| Water | 21.0 |
| Zelec ® NE (Stepan Co.) | 2.8 |
| Tergitol ® TMN-100x (Dow Chemical Co.) | 1.0 |
| Bayferrox ® Yellow 3910 (Lanxess AG) | 58.0 |
| Extender | 2.0 |
| Preservative | 0.2 |
| Total | 100.00 |

The yellow oxide 7C colourant composition, prepared according to Table 1.2, showed good compatibility and colour development in several untinted base paints, but did not show performance characteristics comparable to conventional universal paint colourant. The oleic acid appeared to form an oily film on the resultant pigment dispersion and did not provide as satisfactory humectant properties as ethylene glycol, such that the colourant composition showed premature water evaporation.

Glycerol is a $C_3$ polyalcohol that is non-toxic and commonly used as a humectant in pharmaceutical compositions and personal care/cosmetic formulations. It is water-soluble, and it is not volatile. Therefore, it was considered to be a possible candidate as a component of the dispersing vehicle. However, it is often avoided in paint applications because of the negative effects it can have on film-forming properties of the resultant paint. If present in too high a concentration, glycerol can increase dry time or cause tackiness and make the resultant paint less resistant to water exposure and/or less resistant to physical wear.

Urea is a non-toxic carbamide compound, commonly used in pharmaceutical and cosmetic/personal care formulations, as well as food preparations. Urea is also known have humectant properties. As it is water-soluble and non-volatile, it was also considered as a possible candidate as a component of the dispersing vehicle.

In order to slow the rate of water evaporation and thus increase the open-air dry time, two different compositions were then made, one that incorporated oleic acid and glycerol (Table 1.3) and the other, oleic acid and urea (Table 1.4).

TABLE 1.3

Dispersing vehicle containing oleic acid and glycerol, "Intermediate 8"
Intermediate 8

| Component | weight % |
|---|---|
| Emulsifier (surfactant) | 2.0 |
| Oleic acid | 27.0 |
| Water | 54.0 |
| Glycerol | 16.8 |
| Dimethylethanolamine | 0.2 |
| Total | 100.0 |

TABLE 1.4

Dispersing vehicle containing oleic acid and urea, "Intermediate 9"
Intermediate 9

| Component | weight % |
|---|---|
| Emulsifier | 2.0 |
| Oleic acid | 27.0 |
| Water | 64.8 |
| Urea | 6.0 |
| Dimethylethanolamine | 0.2 |
| Total | 100.0 |

The rheology of Intermediates 8 and 9 was considered acceptable but their storage stability was felt to be inferior compared to conventional universal paint colourants containing ethylene glycol/diethylene glycol.

In an attempt to reduce the appearance of oily film on the resultant tinted paint, believed to be due to the presence of oleic acid, and also to reduce the rate of water evaporation (and thus improve the open-air dry time), additional samples of dispersing vehicle were prepared, in which a portion of the oleic acid content was replaced with PEG-400 (Tables 1.5 and 1.6).

TABLE 1.5

Dispersing vehicle containing oleic acid and PEG-400, "Intermediate 20"
Intermediate 20

| Component | Weight % |
|---|---|
| urea | 4.0 |
| glycerol | 30.0 |
| PEG 400 | 35.0 |
| Oleic acid | 25.0 |
| LDA ™301 (Lorama Inc.) | 6.0 |
| Total | 100.0 |

TABLE 1.6

Dispersing vehicle "Intermediate 21"
Intermediate 21

| Component | Weight % |
|---|---|
| urea | 4.0 |
| glycerol | 40.0 |
| PEG 400 | 35.0 |
| Borchi ®Gen WNS (OMG Borchers GmbH) | 4.0 |
| Oleic acid | 17.0 |
| Total | 100.0 |

Two samples of yellow oxide colourant composition were prepared according to Table 1.2, by replacing Intermediate 7, with Intermediate 20 and Intermediate 21. However, an oily film was still observed in these colourant samples. It was concluded that although oleic acid could provide a base for preparing a dispersing vehicle, it was not equivalent to the performance of ethylene glycol/diethylene glycol as a dispersing vehicle.

Next, dispersing vehicles incorporating polyethylene glycols (PEG) were prepared. It was thought that other components would need to be added to the formulation to make up for the known shortcomings of universal paint colourant compositions based on polyethylene glycols as the main dispersant and dispersing vehicle. As urea and glycerol were used successfully in Intermediates 8, 9, 20 and 21, it was thought that these two compounds might provide the humectant properties. A dispersing vehicle, "Intermediate 22", containing urea, glycerol and PEG-400, was prepared according to Table 1.7.

TABLE 1.7

Dispersing vehicle, "Intermediate 22"
Intermediate 22

| Component | Weight % |
|---|---|
| urea | 5.0 |
| glycerol | 55.0 |
| PEG-400 | 40.0 |
| Total | 100.0 |

Intermediate 22 was observed to be cloudy, so another dispersing vehicle, Intermediate 23, was prepared, in which water was added to aid in dissolution of the urea into the glycerol and PEG-400 (see Table 1.8)

TABLE 1.8

Dispersing vehicle, "Intermediate 23"
Intermediate 23

| Component | Weight % |
|---|---|
| urea | 4.8 |
| water | 4.8 |
| glycerol | 52.4 |
| PEG-400 | 38.0 |
| Total | 100.0 |

The urea was easily dissolved in Intermediate 23 and the composition looked only slightly cloudy, and perceptibly less cloudy than Intermediate 22. As such, another dispersing vehicle sample was prepared, wherein an additional humectant (BYKETOL® PC, BYK-Chemie GmbH) was added to the formulation provided in Table 1.7 ("Intermediate 24", Table 1.9).

TABLE 1.9

Dispersing vehicle, "Intermediate 24"
Intermediate 24

| Component | Weight % |
|---|---|
| urea | 4.8 |
| water | 4.8 |
| glycerol | 52.4 |
| PEG-400 | 35.0 |
| BYKETOL ® PC (BYK-Chemie, GmbH) | 3.0 |
| Total | 100.0 |

Based on the results obtained with Intermediate 23, another dispersing vehicle was prepared, "Intermediate 23A", which was optimized for temperature stability and low cost (see Table 1.10).

TABLE 1.10

Dispersing vehicle, "Intermediate 23A"

Intermediate 23A
| Component | Weight % |
|---|---|
| urea | 8.0 |
| water | 6.0 |
| glycerol | 53.0 |
| PEG-400 | 33.0 |
| Total | 100.0 |

Intermediate 23 A was observed to be completely clear. Based on the results of the optimization tests of Intermediate 23, a working range for each of the components of the VOC, APE-free dispersing vehicle was determined (see Table 1.11).

TABLE 1.11

Working concentration ranges for components of the VOC, APE-free dispersing vehicle

| Component | Combined weight % (approximate) |
|---|---|
| Low molecular weight carbamide compound(s), e.g. urea | about 2 to about 20 |
| Low molecular weight polyalcohol(s), e.g. $C_3$—$C_5$ polyalcohol such as glycerol | about 10 to about 65 |
| PEG-200 to PEG-600 | about 5 to about 45 |
| water (optional) | about 3 to about 25 |
| Total weight of dispersing vehicle | 100.0 |

Low molecular weight carbamide compounds that may be used in preparation of the dispersing vehicle are of the following general formula (1):

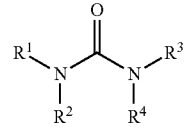

(1)

wherein $R^1$, $R^2$, $R^3$ and $R^4$ are each independently selected from the group consisting of hydrogen, $C_1$-$C_3$ alkyl, and $C_1$-$C_3$ alkanol, and wherein at least one of $R^1$, $R^2$, $R^3$ and $R^4$ is hydrogen. Non-limiting examples of low molecular weight carbamide compounds that may be used include: urea, 2-hydroxyethyl urea, and N,N'-(2-hydroxyethyl)-urea. Combinations of two or more different carbamide compounds may also be used, to a combined weight within the range noted in Table 1.11.

Low molecular weight polyalcohols that may be used in preparation of the dispersing vehicle include $C_3$-$C_5$ polyalcohols such as glycerol ($C_3$), erythritol ($C_4$), threitol ($C_4$), arabitol ($C_5$), xylitol ($C_5$) and ribitol ($C_5$). Combinations of two or more different polyalcohols may also be used, to a combined weight within the range noted in Table 1.11.

The polyethylene glycol (PEG) component of the dispersing vehicle can be composed of a PEG of a single average molecular weight, e.g. PEG-400. Alternatively, the polyethylene glycol component of the dispersing vehicle may be composed of a combination of two or more PEGs of different average molecular weight, to a combined weight within the range noted in Table 1.11.

1.2 Freeze/Thaw Stability Testing of Dispersing Vehicles

To test for "freeze/thaw" temperature stability, samples of dispersing vehicles Intermediate 23 and Intermediate 24 at room temperature (about 25° C.) were observed and then placed in a freezer held at −15° C., for 72 hours. The following samples were included in the study as controls and subjected to the same temperature and storage conditions: (i) a mixture of 60% w/w ethylene glycol and 40% w/w diethylene glycol ("60/40 glycol blend", typically found in conventional paint colourants containing VOCs; and (ii) PEG-400 alone, typically found in low/zero-VOC paint colourants. After 72 hours at −15° C., all of the samples were removed from the freezer and observed for changes in composition as compared to its previous state.

TABLE 1.12

Observation of Dispersing Vehicle Stability After Freeze/Thaw Conditions

| Sample Description | Observation after 72 h at −15° C. |
|---|---|
| 60/40 glycol blend | Unchanged; remained fluid. |
| PEG-400 | Frozen solid. |
| Intermediate 23 (Table 1.8) | Slightly cloudy, slightly more viscous than before storage in freezer. |
| Intermediate 24 (Table 1.9) | Slightly cloudy, more viscous than Intermediate 23 after storage in freezer, but still fluid. |

Intermediate 23 and Intermediate 24 were found to be far more stable to the freeze/thaw conditions than the PEG-400 alone. Both Intermediate 23 and Intermediate 24 remained fluid after 72 hours at −15° C.

1.3 Evaporation Rate of Dispersing Vehicle, Intermediate 23A

Intermediate 23A (Example 1.1, Table 1.10) and the 60/40 glycol blend (Example 1.2) were subjected to elevated temperatures, and weighed at set time intervals during heating to compare their evaporation/drying profiles. This was to determine if Intermediate 23A had a similar drying profile to a glycol dispersing vehicle typically found in conventional colourants containing VOCs.

Samples of each of Intermediate 23A and the 60/40 glycol blend were placed in beakers and stored in a heating oven at 60° C. for 4 hours. After 4 hours, the temperature was increased to 80° C. and held for another 4 hours. The samples were weighed at 1 hour intervals starting from the time just prior to when the samples were placed in the oven (the starting time, "0 hours"). The weight loss was calculated as a percentage of the starting weight, as measured at 0 hours: (loss (g)/total weight at 0 hours (g))×100.

The evaporation profile for the 60/40 glycol blend and Intermediate 23A, showing weight loss versus time, is as provided in FIG. 1. As can be seen in FIG. 1, Intermediate 23A had an evaporation profile that closely matched the 60/40 glycol blend at 60° C. (at 0-4 hours). At 80° C. (at 4-8 hours), Intermediate 23A showed minimal evaporation. In particular, at 80° C. Intermediate 23A exhibited a much slower rate of evaporation than the conventional 60/40 glycol blend, which showed a marked weight loss. Based on these results, it was concluded that Intermediate 23A would likely provide superior humectant properties to both conventional glycol-based dispersing vehicles and low/zero-free VOC dispersing vehicles, particularly at elevated temperatures.

Example 2

Preparation of VOC- and APE-Free Universal Paint Colourant Compositions

Samples of universal paint colourant compositions (also referred to as "VOC, APE-free universal paint colourants" or "universal paint colourants") were prepared as provided below, in Tables 2.1 to 2.8. The following pigment types were chosen as representative of colourants that are widely available: organic red, black, medium yellow, phthalo green, magenta, phthalo blue, yellow oxide and red oxide.

In each case, a universal paint colourant composition was prepared by mixing one or more pigments or other colourant agents with water, a dispersing vehicle from Example 1 (for example, Intermediate 23A, Table 1.10), one or more surfactants, and other additives, such as fillers, rheology modifiers, pH modifiers, and preservatives. For each colourant composition, a proprietary VOC- and APE-free surfactant package was prepared to best suit the properties of the pigment(s) present in the composition, as well as being best suited to creating a universal paint colourant composition that would be universally compatible, i.e. compatible with both alkyd paints and latex paints. Selection of surfactants was done according to such references as (i) Bieleman, J. "Chapter 4: Surface-Active Agents" in *Additives for Coatings*, J. Bieleman, Ed., Wiley-VCH: Weinheim, 2000; (ii) Schick, M. J., "Nonionic Surfactants", in *Surfactant Science Series*, vol. 1, Marcel Dekker Inc.: New York, 1967; and (iii) "The HLB System—a time saving guide to emulsifer selection", in *CHEMMUNIQUE*, ICI Americas Inc.: Wilmington, 1976, revised, March 1985; (iv) K. Holmberg, B. Jonsson, B. Kronberg and B. Lindman, *Surfactants and Polymers in Aqueous Solution*, 2nd ed.; Wiley & Sons: Chichester, 2003. Selection of surfactants was also guided by information provided by manufacturers of surfactants such as Cytec Industries, Inc., Rhodia Inc. and Air Products & Chemicals Inc.

Surfactants that were used include: lecithin such as soya lecithin, secondary alcohol ethoxylates (for example, Tergitol® TMN-100, Dow Chemical Co.), alkylaryl suphonates (for example, Zetasperse® 2300, Air Products & Chemicals Inc.), succinamates, tallow amines and tallow amine ethoxylates (for example, Ethomeen® T/12, AkzoNobel N.V.), and alcohol phosphates and phosphate esters (for example, Zelec® NE, Stepan Co.).

2.1 Preparation of VOC, APE-Free Universal Paint Colourant, Organic Red

| Component | Weight % |
|---|---|
| Intermediate 23A (Table 1.10) | 26.00 |
| Water | 30.00 |
| VOC, APE-free surfactant package | 5.20 |
| NaOH, 10% w/v | 0.20 |
| Anti-foaming agent | 0.20 |
| Pigment Red PR 188: Novoperm ® Red HF3S (Clariant Inc.) | 7.20% |
| Pigment Violet PV19: CIBA ® Cinquasia ® Red RT-195-D (BASF Corp.) | 3.00% |
| Extender | 28.00% |
| Preservative | 0.20% |
| Total | 100.00% |

2.2 Preparation of VOC, APE-Free Universal Paint Colourant, Black

| Component | Weight % |
|---|---|
| Intermediate 23A (Table 1.10) | 24.00% |
| Water | 28.80% |
| VOC, APE-free surfactant package | 8.40% |
| NaOH, 15% w/v | 0.30% |
| Anti-foaming agent | 0.30% |
| Pigment Black N774: Carbon Black 7 (Columbian Inc.) | 9.00% |
| Extender | 29.00% |
| Preservative | 0.20% |
| Total | 100.00% |

2.3 Preparation of VOC, APE-Free Universal Paint Colourant, Medium Yellow

| Component | Weight % |
| --- | --- |
| Intermediate 23A (Table 1.10) | 24.00 |
| Water | 14.60 |
| VOC, APE-free surfactant package | 11.40 |
| NaOH, 10% w/v | 0.20 |
| Anti-foaming agent | 0.20 |
| Pigment Yellow PY74: Hansa ® Yellow 2GX70 (Clariant Inc.) | 12.00 |
| Pigment Yellow PY65: Sunbrite ® Yellow 65 (SunChemical Corp.) | 18.00 |
| Extender | 19.40 |
| Preservative | 0.20 |
| Total | 100.00% |

2.4 Preparation of VOC, APE-Free Universal Paint Colourant, Phthalo Green

| Component | Weight % |
| --- | --- |
| Intermediate 23A | 21.0 |
| Water | 21.8 |
| VOC, APE-free surfactant package | 8.20 |
| NaOH, 15% w/v | 0.2 |
| Anti-foaming agent | 0.2 |
| Pigment PG 7: Sunfast ® Green 7 (SunChemical Corp.) | 10.4 |
| Extender | 38.0 |
| Preservative | 0.2 |
| Total | 100.00 |

2.5 Preparation of VOC, APE-Free Universal Paint Colourant, Magenta

| Component | Weight % |
| --- | --- |
| Intermediate 23A | 23.0 |
| Water | 26.2 |
| VOC, APE-free surfactant package | 8.20 |
| NaOH, 10% w/v | 0.2 |
| Anti-foaming agent | 0.2 |
| Pigment PR 122: Hostaperm ® Pink E (Clariant Inc.) | 9.0 |
| Extender | 33.0 |
| Preservative | 0.2 |
| Total | 100.00 |

2.6 Preparation of VOC, APE-Free Universal Paint Colourant, Phthalo Blue

| Component | Weight % |
| --- | --- |
| Intermediate 23A | 18.0 |
| Water | 35.5 |
| VOC, APE-free surfactant package | 7.50 |
| NaOH, 15% w/v | 0.2 |
| Anti-foaming agent | 0.2 |
| Pigment PB 15:1: Sunfast ® Blue 15:1 (SunChemical Corp.) | 6.4 |
| Extender | 32.0 |
| Preservative | 0.2 |
| Total | 100.00 |

2.7 Preparation of VOC, APE-Free Universal Paint Colourant, Yellow Oxide

| Component | Weight % |
| --- | --- |
| Intermediate 23A (Table 1.10) | 17.0 |
| Water | 14.9 |
| VOC, APE-free surfactant package | 7.40 |
| NaOH, 15% w/v | 0.3 |
| Anti-foaming agent | 0.2 |
| Pigment PY42: Bayferrox ® Yellow 3910 (Lanxess AG) | 58.0 |
| Extender | 2.0 |
| Preservative | 0.2 |
| Total | 100.00 |

2.8 Preparation of VOC, APE-Free Universal Paint Colourant, Red Oxide

| Component | Weight % |
| --- | --- |
| Intermediate 23A (Table 1.10) | 14.0 |
| Water | 19.2 |
| VOC, APE-free surfactant package | 6.2 |
| NaOH @ 15% | 0.2 |
| Defoamer | 0.2 |
| Pigment PR101: Red iron oxide R1599D (Rockwood Pigments NA Inc.) | 60.0 |
| Preservative | 0.2 |
| Total | 100.00 |

Example 3

Compatibility of VOC, APE-Free Universal Paint Colourant Compositions with Alkyd Paints and Latex Paints 3.1 Addition of VOC- and APE-Free Universal Paint Colourant Compositions to Alkyd and Latex Paints The universal colourant compositions as prepared in Example 2 were tested for compatibility with a variety of paints, including water-based and organic solvent-based paints.

The universal colourant compositions were added to untinted base paints according to the following process: a colourant (1% w/w or 10% w/w) was added to a base paint, and mixed for 30 seconds at 2000 rpm using a SpeedMixer™ mixer (FlackTek Inc.). The amount of each universal colourant composition added and the type of base paint are as provided in Table 3.1.

TABLE 3.1

Tinting of Base paints with VOC, APE-free Universal Paint Colourant Compositions

| Base paint | Paint Reference No. | Type of base (water/ organic solvent) | Amount of colourant composition added (weight %) | Compatible? (yes/no) |
| --- | --- | --- | --- | --- |
| Beauti-tone Natura ® Eggshell White Base | 001 | Water | 1% | Yes |
| Beauti-Tone Natura ® Eggshell Medium Base | 002 | Water | 10% | Yes |
| Sherwin-Williams Pro Classic ® Semi-gloss Acrylic Alkyd Emulsion White Base | 003 | Water | 1% | Yes |
| Benjamin Moore Aura ® Waterborne Exterior Low Lustre Finish White Base | 004 | Water | 1% | Yes |
| Benjamin Moore Aura ® Waterborne Exterior Low Lustre Finish Deep Base | 005 | Water | 10% | Yes |
| Lorama ® Polysaccharide Resin Technology ™ (LPRT ™) Modified Premium Alkyd White Base | 006 | Organic solvent | 1% | Yes |
| LPRT ™ Modified Premium High Solids Alkyd White Base | 007 | Organic solvent | 1% | Yes |
| LPRT ™ Modified Premium High Solids Alkyd Accent Base | 008 | Organic solvent | 10% | Yes |
| Premium High Solids Alkyd White Base | 009 | Organic solvent | 1% | Yes |
| Premium High Solids Alkyd Accent Base | 010 | Organic solvent | 10% | Yes |

Following mixing, the universal colourant compositions were observed to be compatible in all of the base paints tested. That is, to the naked eye, the resultant tinted paint appeared to be homogenous and even in tone. The tinted paints were then subjected to further tests to check compatibility of the universal colourant compositions with the base paints.

3.2 Colour Development in Paints Tinted with the VOC- and APE-Free Universal Colourant Compositions In order to check colour dispersion, samples of tinted paint were prepared by addition of 10% w/w of VOC, APE-free universal colourant composition (prepared according to Example 2) to the base paints as listed in Table 3.1. In each case, 27 g of base paint was mixed with 3 g of universal colourant composition according to the process provided in Example 3.1.

Rub-up tests were conducted according to the following method. The tinted paint prepared as noted above was applied to a smooth, dry surface such as a paint test card to form a smooth, continuous thin film of paint, referred to as the "drawdown". The drawdown was then subjected to high shear stress by finger-rubbing a small area of the partially dry paint film (the "rub-up"). That is, a clean finger was used to rub 5-7 circles of approximately 3-4 cm in diameter in the partially dry paint film. Following the rub-up, the drawdown was left to dry under normal atmospheric conditions and room temperature (about 25° C.).

The rub-up tends to disperse undeveloped colorant, if any is present, and produces a color variation between the unsheared and sheared areas of the paint film. Any variations in colour intensity in the rubbed portion of the paint film would indicate poor colour development or acceptance, due to incomplete dispersion of the colourant composition into the base paint and/or flocculation of the colourant composition upon addition to the base paint. Incomplete dispersion of the colourant composition would indicate likely incompatibility of the colourant composition with the base paint.

The results of the rub-up tests are summarized in Table 3.2.

TABLE 3.2

Results of Rub-up Compatibility Tests of VOC- and APE-Free Universal Paint Colourant Compositions with Various Base paints

| Universal Colourant Composition | Base paint Reference No. (refer to Table 3.1) | | | | | | | | | |
| --- | --- | --- | --- | --- | --- | --- | --- | --- | --- | --- |
| | 001 | 002 | 003 | 004 | 005 | 006 | 007 | 008 | 009 | 010 |
| Yellow Oxide (Example 2.7) | None | None | None | None | None | None | None | None | None | None |
| Red Oxide (Example 2.8) | None | None | None | None | None | Slight | None | None | None | None |
| Black (Example 2.2) | None | None | None | None | None | Slight | None | None | None | None |
| Phthalo Green (Example 2.4) | None | None | None | None | None | None | None | None | None | None |

TABLE 3.2-continued

Results of Rub-up Compatibility Tests of VOC- and APE-Free Universal Paint Colourant Compositions with Various Base paints

| Universal Colourant Composition | Base paint Reference No. (refer to Table 3.1) | | | | | | | | | |
|---|---|---|---|---|---|---|---|---|---|---|
| | 001 | 002 | 003 | 004 | 005 | 006 | 007 | 008 | 009 | 010 |
| Magenta (Example 2.5) | None | None | None | None | None | None | None | None | None | None |
| Medium Yellow (Example 2.3) | None | None | None | None | None | None | None | None | None | None |

None of the tinted paints showed any significant colour variation. It was concluded that for the base paints and the universal colourant compositions tested, there was no incompatibility or flocculation of the universal colourant compositions upon mixing with the base paints.

3.3 Viscosity of Paint Following Addition of the VOC- and APE-Free Universal Colourant Composition The viscosity change of representative base paints following addition of the VOC, APE-free universal paint colourant compositions (according to Example 2) was compared to the viscosity change following addition to the same base paint of (i) commercially available VOC-free paint colourant compositions of corresponding pigment type and (ii) conventional paint colourant compositions containing VOCs of corresponding pigment type. A significant decrease in viscosity dependent on the base paint, following the addition of colourant composition to the untinted base paint would indicate a change in rheology.

Two water-based base paints, Beauti-Tone Natura® Eggshell Medium Base (Table 3.1, paint reference no. 002), and Benjamin Moore Aura® Waterborne Exterior Low Lustre Finish Deep Base (Table 3.1, paint reference no. 005), were chosen as representative examples for commercially available water-based base paints.

The following VOC, APE-free universal paint colourants (prepared according to Example 2) were added to the above-noted base paints: black (Example 2.1); magenta (Example 2.5); yellow oxide (Example 2.7); red oxide (Example 2.8); phthalo green (Example 2.4); medium yellow (Example 2.3); organic red (Example 2.1); and phthalo blue (Example 2.6). For each of these universal colourant compositions, the corresponding colourant with the same or similar pigment type (i.e. black, magenta, yellow oxide, red oxide, phthalo green, medium yellow, organic red and phthalo blue) was chosen from a family of commercially available VOC-free universal paint colourants and from a family of commercially available conventional VOC-containing universal paint colourants.

In each case, 10% w/w of each colourant composition was added to the untinted base paint and mixed according to the process provided in Example 3.1, to provide tinted paint samples. The viscosity of the paint was measured before and after the colourant composition was mixed with the base paint. The change in viscosity was calculated as the viscosity drop.

The results of the viscosity tests for the water-based paint are provided in FIG. 1. The results of the viscosity tests for the organic solvent-based paint are provided in FIG. 2. In both FIG. 1 and FIG. 2, the viscosity drop for each tinted paint sample, according to the type of colourant composition that was used to tint the paint, is shown as a shaded bar. The light grey-shaded bars denote the viscosity drop of paint samples tinted with the VOC, APE-free universal colourant compositions as prepared in Example 2 ("VOC, APE-free colourant"). The medium gray-shaded bars denote the viscosity drop of paint samples that were tinted with commercially available VOC-free universal paint colourants of corresponding pigment type ("Commercial VOC-free colourant"). The black-shaded bars denote the viscosity drop of paint samples tinted with commercially available conventional VOC-containing universal paint colourants of corresponding pigment type ("Conventional colourant").

Figure 2:
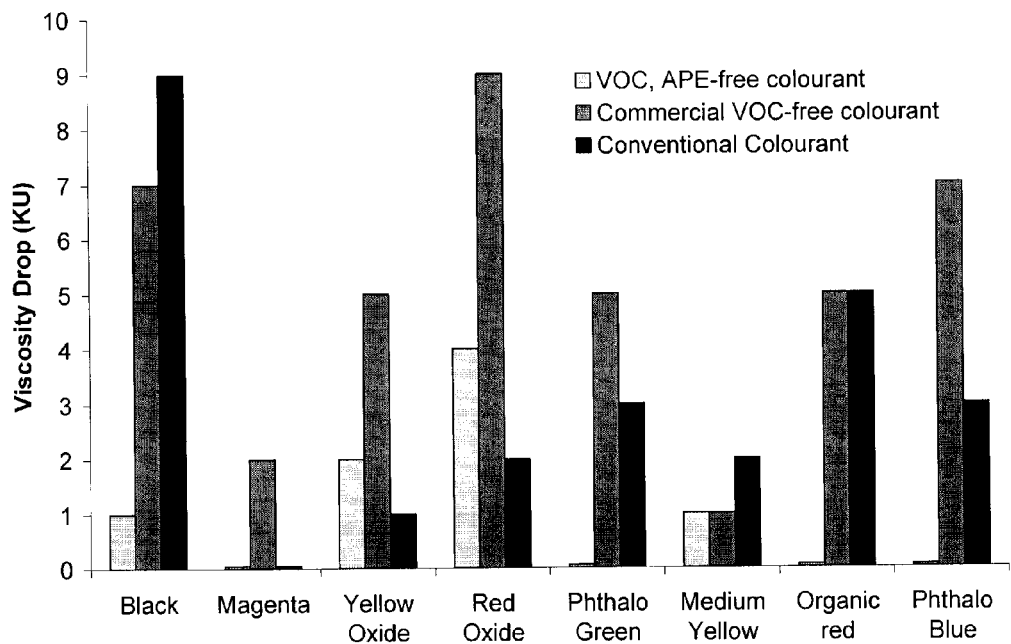
FIG. 2 illustrates a comparison of the viscosity decrease of samples of a latex paint tinted with the following colourants of corresponding pigment type: (i) a VOC, APE-free universal paint colourant composition according to Example 2 (denoted as "VOC, APE-free universal colourant"); (ii) the corresponding commercially available VOC-free universal paint colourant composition (denoted as "Commercial VOC-free colourant"), and (iii) the corresponding conventional paint colourant composition containing VOCs (denoted as "Conventional Colourant"); wherein the pigment type is as specified along the x-axis and the viscosity decrease was measured according to Example 3.3.
Figure 3:
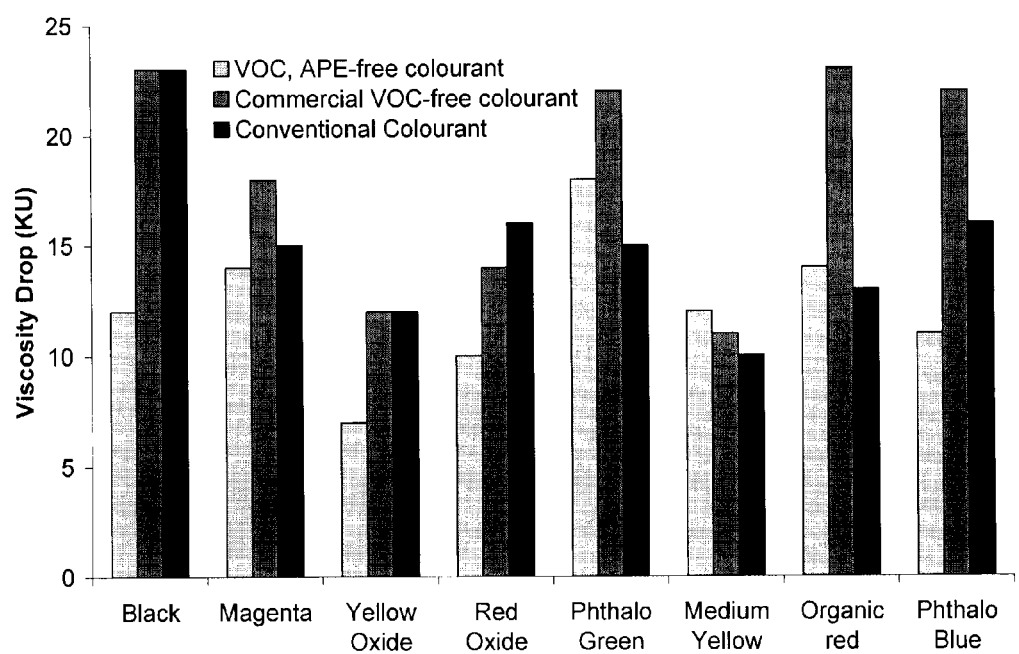
FIG. 3 illustrates a comparison of the viscosity decrease of samples of a latex paint tinted with the following colourants of corresponding pigment type: (i) a VOC, APE-free universal paint colourant composition according to Example 2 (denoted as "VOC, APE-free universal colourant"); (ii) the corresponding commercially available VOC-free universal paint colourant composition (denoted as "Commercial VOC-free colourant"), and (iii) the corresponding conventional paint colourant composition containing VOCs (denoted as "Conventional Colourant"); wherein the pigment type is as specified along the x-axis and the viscosity decrease was measured according to Example 3.3.

No significant change in viscosity was observed following addition and mixing of the VOC, APE-free universal colourant compositions to the untinted base paints. In most cases, the paint samples tinted with the VOC, APE-free universal colourants had a viscosity drop that was equal to or less than that observed for paint samples tinted with the corresponding conventional VOC-containing colourant (see for example: FIG. 1, the viscosity drop of latex paint samples tinted with organic red; FIG. 2, the viscosity drop of alkyd paint samples tinted with black). In those cases where the viscosity drop of the paints tinted with VOC, APE-free universal colourant was higher than the corresponding paint sample tinted with conventional colourant, the difference was 5 KU or less and thus considered to be a relatively small difference. Also, in most cases, the paint samples tinted with the VOC, APE-free universal colourants had a viscosity drop that was significantly less than that observed for paint samples tinted with the corresponding commercially available VOC-free colourant (see for example, FIG. 1, the viscosity drop of latex paint samples tinted with phthalo blue).

It was noted that in a number of cases, the paint samples tinted with the commercially available VOC-free colourants showed a viscosity drop that was significantly higher than both the corresponding paint samples tinted with the VOC, APE-free universal colourant and the conventional colourant (see for example, FIG. 2, the viscosity drop of alkyd paint samples tinted with organic red).

It was concluded that, based on the results of the viscosity test, the VOC, APE-free universal colourant compositions showed superior performance with both alkyd and latex paints, than the corresponding colourants from a commercially available family of VOC-free universal paint colourants. Specifically, as no significant viscosity drop was observed upon addition of the VOC, APE-free universal colourants to the base paints, no negative effect on the physical and performance characteristics of the resultant tinted paint would be expected to occur.

3.4 Colour Strength of Paints Tinted with VOC- and APE-Free Universal Paint Colourant Compositions and Paints Tinted with Conventional Colourant Compositions Samples of a base paint tinted with the VOC, APE-free universal colourant compositions (prepared according to Example 2) were compared with samples of paint tinted with the corresponding colourants selected from a family of a conventional VOC-containing colourants.

Colour strength (also referred to as "tint strength") refers to the power of a pigment or colourant to impart colour to a white (untinted) base paint. Tint strength is measured relative to a standard pigment or colourant in the same base paint. Tint strength of a tinted paint sample is typically measured with the use of a spectrophotometer and the resultant spectrum is then analyzed and compared with a standard colourant in the same base paint that was used for the sample. A tint strength of 100% would indicate that the sample colourant provides the same pigment strength as the standard colourant. A tint strength of less than 100% would indicate that the sample colourant has a weaker pigment strength than the standard colourant, while a tint strength of less than 100% would indicate that the sample colourant has a stronger pigment strength than the standard colourant. The typical specification for quality control approval of the tint strength of a pigment or colourant, compared to the standard, is ±2.0%.

Samples of a representative latex base paint (Beauti-tone Natura® Eggshell White Base) were individually tinted with 1% w/w of each the VOC, APE-free universal colourants and the corresponding VOC-containing conventional colourants, using the mixing process according to Example 3.1. Drawdowns were prepared according to Example 3.2. The colour strength of the experimental was measured relative to the corresponding paint samples tinted with corresponding conventional colourant. For each colour strength measurement, the sample of paint tinted with the corresponding conventional colourant were taken as the standard. Measurements and analysis were carried out using a spectrophotometer Datacolor™400 (Datacolor Inc.) and Datacolor™ colour matching software (Datacolor Inc.).

The measured colour strengths are provided in Table 3.4.

TABLE 3.4

Colour Strength of Paints Tinted with VOC, APE-free
Universal Colourants, Compared to
Paints Tinted with Conventional Colourants

| VOC, APE-free universal colourant | Colour strength |
| --- | --- |
| Black (Example 2.2) | 100.6 |
| Magenta (Example 2.5) | 98.8 |
| Yellow Oxide (Example 2.7) | 98.6 |
| Red Oxide (Example 2.8) | 101.1 |
| Phthalo Green (Example 2.4) | 99.3 |
| Medium Yellow (Example 2.3) | 99.6 |
| Organic Red (Example 2.1) | 100.9 |
| Phthalo Blue (Example 2.6) | 98.9 |

In addition, all of the samples of paint tinted with the VOC, APE-free universal paint colourant exhibited a colour strength within 2% of the paint samples tinted with the conventional colourant. From these results, it was concluded that the universal paint colourants provide tinting of equivalent colour strength to convention VOC-containing colourants, when used to tint the same base paint.

3.5 Conclusions

In view of the results obtained in the compatability tests, as described in Example 3.1, it was concluded that the VOC, APE-free universal colourant compositions were compatible with a wide variety of paints and coatings, including water-based and organic solvent-based paints.

In Example 3.2, the universal colourants also showed complete dispersion of colourant upon addition and mixing with representative alkyd and latex base paints. In view of the results of Example 3.1, the universal colourants were expected to show complete dispersion and resultant good colour development, when added to a wide variety of both water-based and organic solvent-based paints.

In addition, the VOC, APE-free universal colourants did not cause any significant drop in viscosity upon addition and mixing with representative alkyd and latex base paints (see Example 3.3). This was in marked contrast to a number of examples of base paints tinted with commercially available VOC-free paint colourants. A significant drop in viscosity would be associated with negative effects on the physical and performance characteristics of the resultant tinted paint, such as a decrease in storage stability. Therefore, based on the results of the viscosity test of Example 3.3, the universal colourants were expected to have little to no negative impact upon the physical and performance characteristics of the resultant tinted paint. In addition, in view of the compatibility tests of Examples 3.1 and 3.2, it was expected that the VOC, APE-free universal paint colourants would have little to no negative impact upon the physical and performance characteristics when added to a wide variety of paints and coatings, including water-based and organic solvent-based paints.

The VOC, APE-free universal paint colourants provided tinting of equivalent colour strength to conventional VOC-containing colourants, when used to tint the same base paint. In view of the compatibility tests of Examples 3.1 and 3.2, it was expected that the VOC, APE-free universal paint colourants would provide tinting of equivalent colour strength to convention colourants, in a wide variety of paints and coatings, including water-based and organic solvent-based paints.

Example 4

Canister Stability of VOC- and APE-Free Universal
Paint Colourant Compositions

The storage stability of the VOC- and APE-free universal paint colourant compositions (prepared according to Example 2) was tested by storing the compositions in canisters typically used for dispensing colourants during such operations as in-store tinting Two colourant compositions were chosen as representative of the VOC, APE-free universal colourant compositions of Example 2: yellow oxide (Example 2.7) and red oxide (see Example 2.8). Commercially available VOC-free universal colourants in yellow oxide and red oxide were subjected to the same test conditions, and used for comparison. The colourants were each placed in individual canisters of a Blendorama® 22PD dispenser (Fluid Management, Inc.). The dispenser includes a number of canisters with an attached dispensing nozzle which is often exposed to the atmosphere for long periods of time.

Each colourant composition was stored in a dispensing canister wherein the dispensing nozzle was exposed to the atmosphere, at room temperature (around 25° C.). This was to simulate the storage conditions of dispensing canisters used by stores and businesses that provide in-store tinting of base paints. The colourant compositions were left undisturbed in their respective canisters and then dispensed at intervals of 4 days, 7 days and 14 days after placement in the canister. Dispensing the colourant composition would provide signs of thickening or drying out of the composition that would lead to a partially or fully blocked dispensing nozzle. Signs of thickening or drying out would be readily apparent as difficulty in dispensing (for example, dripping or leakage, lack of smooth flow from the nozzle) and the presence of dried colourant on or around the nozzle tip. The results of the canister storage stability tests are summarized in Table 4.1 and Table 4.2.

TABLE 4.1

Results of Yellow Oxide Canister Storage Stability Test

4 Days Without Dispensing

| | |
|---|---|
| VOC, APE-free Universal Colourant Yellow Oxide | Clean, no dripping from nozzle. Dispensed smoothly and with ease. No residual colourant composition left hanging from nozzle tip. |
| Commercial VOC Free Yellow Oxide | Dirty, colourant dried around nozzle tip. Fresh colourant leaking from nozzle tip. Difficult to dispense. Blockage caused colourant to squirt out on an angle and miss the container. |

7 Days Without Dispensing

| | |
|---|---|
| VOC, APE-free Universal Colourant Yellow Oxide | Clean, no dripping from nozzle. Dispensed smoothly and with ease. No residual left hanging. |
| Commercial VOC Free Yellow Oxide | Dirty, colourant dried around nozzle tip. Fresh colourant leaking from nozzle tip. Difficult to dispense. Blockage caused colourant to squirt out on an angle and miss the container. A dried chunk of colourant was dislodged from the nozzle during dispensing and stuck to the end of the nozzle. |

14 Days Without Dispensing

| | |
|---|---|
| VOC, APE-free Universal Colourant Yellow Oxide | Clean, no dripping from nozzle. Dispensed smoothly and with ease. No residual colourant composition left hanging form nozzle tip. |
| Commercial VOC Free Yellow Oxide | Dirty, colourant dried around tip. Fresh colourant leaking from tip. Very difficult to dispense. Blockage caused colourant to squirt out on an angle and miss the container. |

TABLE 4.2

Results of Red Oxide Canister Storage Stability Test

4 Days Without Dispensing

| | |
|---|---|
| VOC, APE-free Universal Colourant Red Oxide | Clean, no dripping. Dispensed smoothly and with ease. No residual left hanging. |
| Commercial VOC Free Red Oxide | Dirty, colourant dried around tip. Fresh colourant leaking from tip. Difficult to dispense at first, then became smooth. |

7 Days Without Dispensing

| | |
|---|---|
| VOC, APE-free Universal Colourant Red Oxide | Clean, no dripping. Dispensed smoothly and with ease. No residual left hanging. |
| Commercial VOC Free Red Oxide | Dirty, colourant dried around tip. Fresh colourant leaking from tip. Difficult to dispense at first, then became smooth. |

14 Days Without Dispensing

| | |
|---|---|
| VOC, APE-free Universal Colourant Red Oxide | Clean, no dripping. Dispensed smoothly and with ease. No residual left hanging. |
| Commercial VOC Free Red Oxide | Dirty, colourant dried around tip. Fresh colourant leaking from tip. Unable to dispense. Nozzle was completely blocked. |

The yellow oxide and red oxide VOC, APE-free universal colourant compositions prepared according to Example 2 showed superior storage stability to the comparable commercially available yellow oxide and red oxide VOC-free colourant compositions. The yellow oxide and red oxide VOC, APE-free universal colourant compositions dispensed with ease at every interval that the respective canisters were dispensed, indicating an extended open-air dry time. After 14 days, of placement in the canisters, the yellow oxide and red oxide universal colourant compositions dispensed with ease, with no significant sign of change in rheology or composition. In comparison, both the commercially available yellow oxide and red oxide VOC-free colourant compositions showed signs of blockage of the dispensing nozzles starting at 4 days after placement in their respective canisters, and complete blockage of the dispensing nozzles by 14 days, indicative of drying out of the composition within the dispensing canister.

From the results of this test, it was concluded that the VOC, APE-free universal colourant compositions had an extended open-air dry time, and may be exposed to the atmosphere for extended periods of time of at least 14 days, and up to about 21 days, without any significant changes in rheology or composition. Taken in conjunction with the stability tests of Example 1.2 and 1.3, it was also concluded that the VOC, APE-free universal colourants have superior humectant properties that allow the colourants to withstand storage at extremes of temperature as well as extended exposure to the atmosphere, without any significant changes in rheology or composition. As such, it was concluded that the VOC, APE-free universal colourants overcome the problems of premature drying and lack of stability and compatibility exhibited by typical examples of commercially available VOC-free colourants.

Numerous modifications, variations, and adaptations may be made to the particular embodiments of the invention described above without departing from the scope of the invention, which is defined in the following claims.

We claim:

1. A dispersing vehicle for a universal colourant composition, comprising:
   (i) one or more compounds selected from the group consisting of compounds of formula (1):

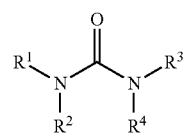

(1)

wherein $R^1$, $R^2$, $R^3$ and $R^4$ are each independently selected from the group consisting of hydrogen, $C_1$-$C_3$ alkyl, and $C_1$-$C_3$ alkanol, and wherein at least one of $R^1$, $R^2$, $R^3$ and $R^4$ is hydrogen;
   (ii) one or more compounds selected from the group consisting of compounds of formula (2):

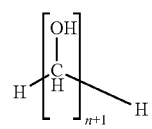

(2)

wherein n=2, 3, or 4;
   (iii) one or more polyethylene glycols of average molecular weight between about 200 g/mol to about 600 g/mol; and
   (iv) optionally water; and wherein said dispersing vehicle is essentially free of volatile organic compounds and alkyl phenol ethoxylates, and comprises 2-hydroxyethyl urea.

2. The dispersing vehicle according to claim 1, wherein in said dispersing vehicle:
   (i) said compound(s) of formula (1) is/are present in the amount of about 2% to about 20% by weight of said dispersing vehicle;
   (ii) said compound(s) of formula (2) is/are present in the amount of about 10% to about 65% by weight of said dispersing vehicle;
   (iii) said polyethylene glycol(s) is/are present in the amount of about 5% to about 45% by weight of said dispersing vehicle; and
   (iv) wherein said water, if present, is present in the amount of about 3% to about 25% by weight of said dispersing vehicle.

3. The dispersing vehicle according to claim 1, wherein in said dispersing vehicle:
   (i) said compound(s) of formula (1) is/are present in the amount of about 3% to about 18% by weight of said dispersing vehicle;
   (ii) said compound(s) of formula (2) is/are present in the amount of about 15% to about 60% by weight of said dispersing vehicle;
   (iii) said polyethylene glycol(s) is/are present in the amount of about 8% to about 40% by weight of said dispersing vehicle; and
   (iv) wherein said water, if present, is present in the amount of about 4% to about 20% by weight of said dispersing vehicle.

4. The dispersing vehicle according to claim 1, wherein said dispersing vehicle comprises urea and the 2-hydroxyethyl urea.

5. The dispersing vehicle according to claim 1, wherein said dispersing vehicle comprises glycerol.

6. The dispersing vehicle according to claim 1, wherein the one or more polyethylene glycols has an average molecular weight of 400 g/mol (PEG-400).

7. The dispersing vehicle according to claim 1, wherein said dispersing vehicle comprises:
   (i) urea and 2-hydroxyethyl urea;
   (ii) glycerol; and
   (iii) optionally water,
wherein the one or more polyethylene glycols has an average molecular weight of about 400 g/mol (PEG-400).

8. A dispersing vehicle for a universal colourant composition, comprising:
   (i) one or more compounds selected from the group consisting of compounds of formula (1):

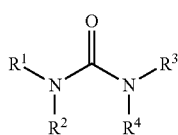

(1)

wherein $R^1$, $R^2$, $R^3$ and $R^4$ are each independently selected from the group consisting of hydrogen, $C_1$-$C_3$ alkyl, and $C_1$-$C_3$ alkanol, and wherein at least one of $R^1$, $R^2$, $R^3$ and $R^4$ is hydrogen;
   (ii) one or more compounds selected from the group consisting of compounds of formula (2):

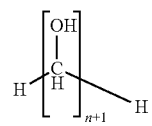

(2)

wherein n=2, 3, or 4;
   (iii) one or more polyethylene glycols; and
   (iv) optionally water; and
wherein said dispersing vehicle is essentially free of volatile organic compounds and alkyl phenol ethoxylates, and comprises:
   (i) urea, in the amount of about 5% by weight of said dispersing vehicle;
   (ii) glycerol, in the amount of about 55% by weight of said dispersing vehicle; and
   (iii) optionally water,
   wherein the one or more polyethylene glycols has an average molecular weight of about 400 g/mol (PEG-400), in the amount of about 40% by weight of said dispersing vehicle.

9. The dispersing vehicle according to claim 8, wherein said dispersing vehicle comprises:
   (i) water, in the amount of about 6% by weight of said dispersing vehicle,
wherein the urea is present in the amount of about 8% by weight of said dispersing vehicle, the glycerol is present in the amount of about 53% by weight of said dispersing vehicle, and the PEG-400 is present in the amount of about 33% by weight of said dispersing vehicle.

10. The dispersing vehicle according to claim 8, wherein said dispersing vehicle comprises:
   (i) water, in the amount of about 5% by weight of said dispersing vehicle,
wherein the urea is present in the amount of about 5% by weight of said dispersing vehicle, the glycerol is present in the amount of about 52% to 53% by weight of said dispersing vehicle, and the PEG-400 is present in the amount of about 38% by weight of said dispersing vehicle.

11. A universal colourant composition, comprising one or more colourant agents, and a dispersing vehicle, wherein said dispersing vehicle comprises:
   (i) one or more compounds selected from the group consisting of compounds of formula (1):

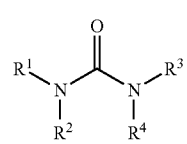

(1)

wherein $R^1$, $R^2$, $R^3$ and $R^4$ are each independently selected from the group consisting of hydrogen, $C_1$-$C_3$ alkyl, and $C_1$-$C_3$ alkanol, and wherein at least one of $R^1$, $R^2$, $R^3$ and $R^4$ is hydrogen;
   (ii) one or more compounds selected from the group consisting of compounds of formula (2):

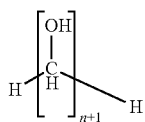

(2)

wherein n=2, 3, or 4;
(iii) one or more polyethylene glycols of average molecular weight between about 200 g/mol to about 600 g/mol; and
(iv) water;
wherein said colourant composition optionally comprises one or more additives selected from the group consisting of one or more surfactants, one or more humectants, one or more extender fillers, one or more anti-foaming agents, one or more pH modifiers, one or more preservatives, and any combination thereof; and
wherein said colourant composition is essentially free of volatile organic compounds and alkyl phenol ethoxylates, and is provided in concentrate form.

12. A process of preparing a universal colourant composition, comprising:
(a) providing a dispersing vehicle comprising:
(i) one or more compounds selected from the group consisting of compounds of formula (1):

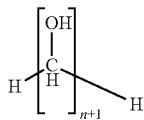

(1)

wherein $R^1$, $R^2$, $R^3$ and $R^4$ are each independently selected from the group consisting of hydrogen, $C_1$-$C_3$ alkyl, and $C_1$-$C_3$ alkanol, and wherein at least one of $R^1$, $R^2$, $R^3$ and $R^4$ is hydrogen;
(ii) one or more compounds selected from the group consisting of compounds of formula (2):

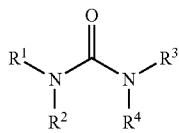

(2)

wherein n=2, 3, or 4; and
(iii) one or more polyethylene glycol(s) of average molecular weight between about 200 g/mol to about 600 g/mol; and
(iv) optionally water;
(b) combining one or more colourant agents with said dispersing vehicle to form a mixture; and
(c) optionally combining the mixture of step (b) with one or more additives selected from the group consisting of one or more surfactants, one or more humectants, one or more extender fillers, one or more anti-foaming agents, one or more pH modifiers, one or more preservatives, and any combination thereof; and
wherein said colourant composition is essentially free of volatile organic compounds and alkyl phenol ethoxylates, and comprises 2-hydroxyethyl urea.

* * * * *